Feb. 22, 1949.　　　　　F. CRAWFORD　　　　　2,462,365
FISHING REEL
Filed Jan. 2, 1947　　　　　　　　　　　　　2 Sheets-Sheet 1
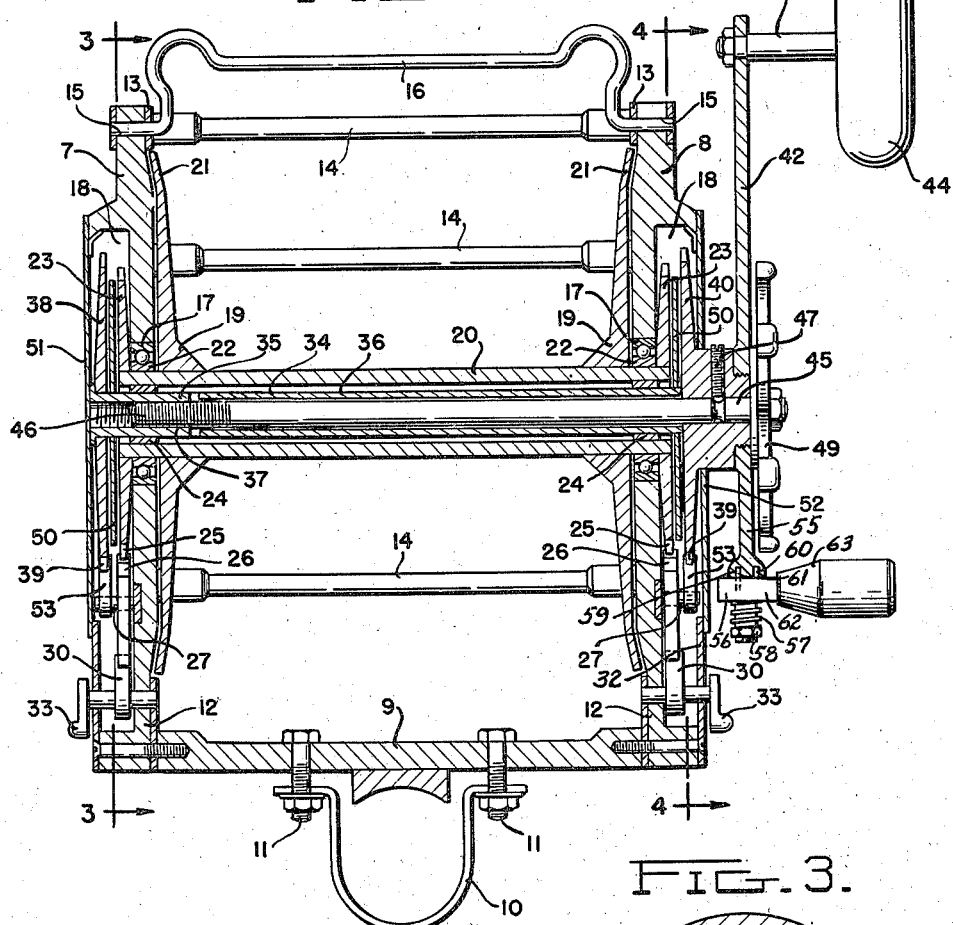
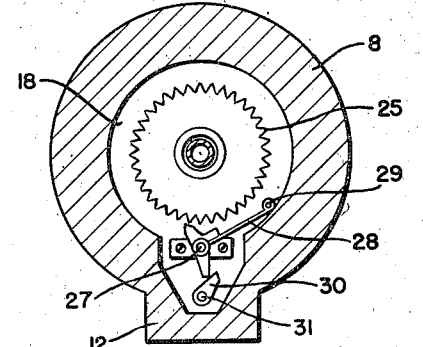
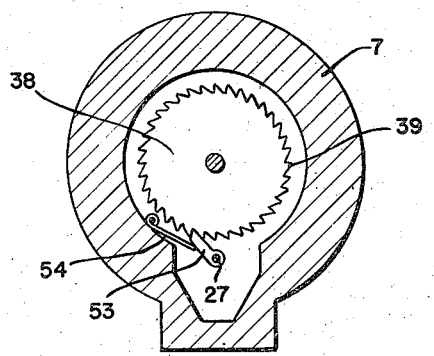
Inventor
FRANK CRAWFORD
By Mason, Porter, Diller & Stewart
Attorneys Feb. 22, 1949.                    F. CRAWFORD                    2,462,365
                                   FISHING REEL
Filed Jan. 2, 1947                                              2 Sheets-Sheet 2
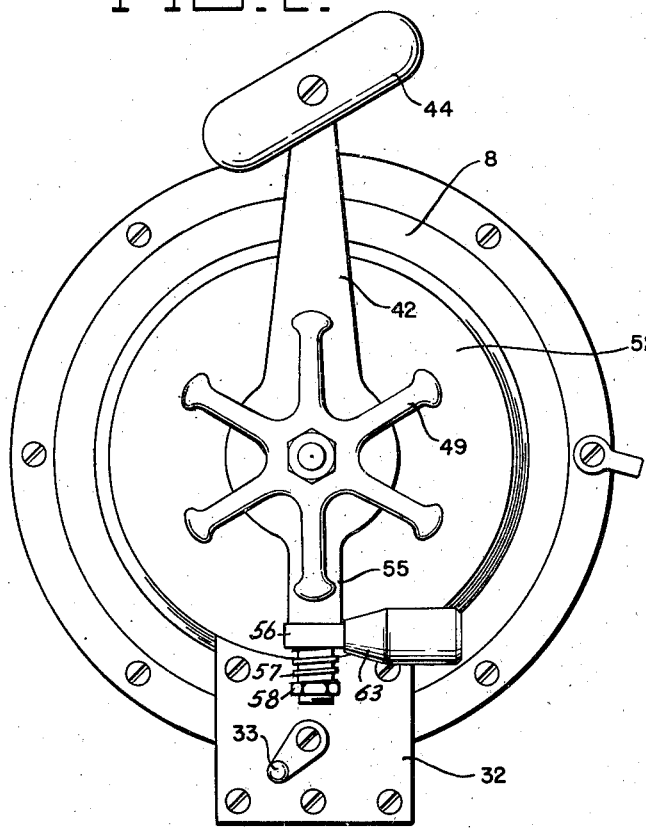
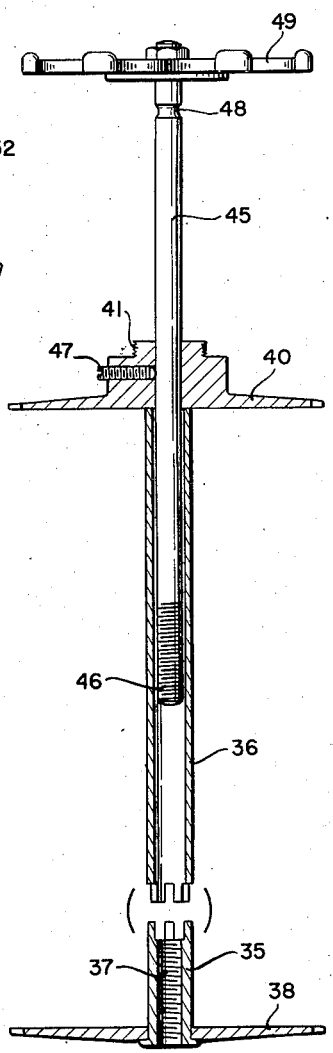
Inventor
FRANK CRAWFORD
By Mason Porter Miller & Stewart
Attorneys Patented Feb. 22, 1949

2,462,365

UNITED STATES PATENT OFFICE 2,462,365

FISHING REEL

Frank Crawford, Lihue, Territory of Hawaii

Application January 2, 1947, Serial No. 719,668

5 Claims. (Cl. 242—84.6)

The following is a specification in detail of my improvements in fishing reels. Deep sea fishing for large game fish demands equipment which shall be rugged and heavy but at the same time easy to manipulate and capable of adjustment to suit varying conditions encountered. The reeling in of the line while retaining a firm grip on the rod and while preventing the possibility of line burn, suggests change in the usual design of the reel. In a like manner the braking effect of a friction clutch interposed between the hand crank and the spool should be modified to suit the load imposed on the line. At the same time, wear on the reel is minimized when this braking effect is divided between the opposite sides of the reel. The design of a reel which shall permit ready lubrication but at the same time protect the equipment from salt spray, is also an important factor.

It is an object of my invention to provide a simple but powerful fishing reel which will withstand the heavy duty required in deep sea fishing.

A still further object of my invention is to provide a close adjustment of the braking tension imposed through the winding clutches.

These and other objects of my invention will be evident from the detailed description of the preferred form of my invention which follows and which is illustrated on the accompanying drawings in which:

Fig. 1 is an axial longitudinal section of my improved fishing reel;

Fig. 2 is an end view of the same;

Fig. 3 is a partial section on the line 3—3 of Fig. 1;

Fig. 4 is a partial section on the line 4—4 of Fig. 1 and

Fig. 5 is a side view partly in section of the spool and its shaft.

The reel is built up from two side cheek plates 7 and 8. These plates are mounted on a reel seat bar 9 which has a clamp 10. The clamp 10 is drawn up around the fishing rod by means of bolts 11, 11.

The cheek plates as indicated in Fig. 2 have radial extensions 12, 12 so that the reel itself is elevated well above the seat bar 9. In this way the winding of the spool is made more convenient and the fishing line is kept clear from the rod and prevented from burning, while added room is provided for the control mechanisms.

The inner face of each plate 7 and 8 has a peripheral plate 13. Pillar posts 14 cooperate with the seat bar 9 to space the plates 13 and cheek plates in parallelism.

The cheek plates have holes 15 diametrically opposite the seat bar 9. These holes serve to journal loosely a harness clip 16 as shown in Fig. 1.

Each cheek plate 7 and 8 has a central ball bearing outer race 17.

Recesses 18 are formed in the cheek plates 7 and 8 outwardly of the ball bearing races 17.

A spool 19 is formed with a hollow hub 20 and opposite separate flanges or ends 21, 21. The ends are notched and terminate in the planes of the plates 13. The hub 20 carries inner ball bearings 22, 22 which ride within the races 17. The hollow hub 20 extends beyond the ball bearings 22, 22 and within the recesses 18 the ends of the hub carry driven clutch plates 23, 23. These clutch plates occupy part of the recesses 18, 18.

The hub 20 has two spaced inner bushings 24, 24 which are substantially in the planes of the ball bearings 22, 22.

The outer edges of clutch plates 23, 23 have teeth 25 by which the rotation of the spool is rendered audible.

For this purpose a click 26 is mounted loosely on a post 27 within the recess 18 and serves to engage the teeth 25. The click is held up in engagement with the teeth 25 by means of a spring 28 suitably anchored on a pin 29 fixed in the recess 18.

The click 26 may be moved into the path of the teeth 25 by means of a pawl 30. This pawl is mounted on a shaft 31 which passes through the recess 18. The shaft 31 extends out of the recess which at this point is covered by a cover plate 32. The end of the shaft 31 carries a thumb lever 33 by which the click 26 may thus be rotated into the path of the teeth 25.

A tubular shaft 34 is mounted slidably on the bushings 24, 24. The shaft is in two sections 35 and 36. These have their adjacent ends castellated or notched so that they interengage but are free to be adjusted in an axial direction.

Shaft section 35 is screw-threaded as at 37 while section 36 has a smooth bore.

Shaft section 35 terminates in a clutch drive plate 38 opposite one clutch plate 23. The plate 38 has peripheral teeth 39 by which the plate 38 and the shaft 34 may be constrained for rotation in one direction only.

Shaft section 36 carries a second clutch drive plate 40 which is opposite the second driven clutch plate 23. The plate 40 also has teeth 39 to control the one-way rotation.

Clutch plate 40 has an enlarged hub 41 extending beyond the side of the cheek plate 8. This hub is screw-threaded to receive a crank 42. At the end of the crank there is a stub shaft 43 with a loose handle 44 by which the two driving clutch plates 38 and 40 may be turned.

Hub 41 has an axial opening in alignment with the smooth bore of shaft section 36. Within this opening and bore there is a loose spindle 45. The spindle is screw-threaded at its inner end 46 while the opposite end projects beyond the crank 42. A lock screw 47 runs radially through the hub 41 and engages a groove 48 in the spindle 45. In this way the spindle is free to rotate but to move axially only to a slight degree.

The spindle 45 extends beyond the hub 41. At its outer extremity the spindle carries a star wheel 49. The inner face of the star wheel and the outer face of the hub 41 have a series of registering complementary radial ribs and recesses. By resiliently moving the star wheel 49, the ribs move into the notches with varying degrees of tension on the shaft section 35. Friction plates 50, 50 are interposed between the driven clutch plates 23, 23 and the corresponding drive clutch plates 38 and 40. As the star wheel 49 is adjustably rotated the frictional engagement of the clutches is varied by small degrees. By making the driven clutch plates 23, 23 slightly concave, engagement begins at the periphery and there is thus a closer regulation of the degree of tension.

Clutch drive plate 38 in its outermost position contacts a cover plate 51 which is locked into position to cover the recess 18. Thus, when the spindle 45 is given reverse rotation, as soon as clutch plate 38 rests against the cover plate 51, further opening movement occurs only at the opposite clutch, namely through retraction of the plate 40. A cover plate 52 completes the housing of recess 18 in the cheek plate 8.

The drive clutch plates 38 and 40 are prevented from reverse rotation by means of pawls 53, 53. These pawls are loosely mounted on the pivot posts 27, 27. These pawls 53, 53 are held up in engagement with the teeth 39 of the drive plates 38, 40 by means of springs 54 (See Fig. 4).

In order to permit more rapid free rotation of the spool, the crank 42 has an extension 55 a short distance in the opposite direction from the hub 41 to provide a shaft bearing. This bearing carries a loose collar 56 which is held on by means of a spring 57 and nut 58. The collar extension 55 has two recesses 59 and 60 separated 90 degrees apart. The collar 56 has a tooth 61 which is held in either recess 59 or 60 by means of the spring 57.

The collar 56 has a lateral handle 62 carrying a loose sleeve 63. The handle 62 normally rests in the plane of the crank 42 as shown in Fig. 2. However, when it is desired to reel in the line rapidly, the handle 62 is drawn down to compress spring 57 and tooth 61 is then brought into recess 59. The sleeve 63 will then permit a rapid rotation of the drive clutch plates 38 and 40. Dependent upon the frictional engagement imposed by the adjustment of the star wheel 49, there will be corresponding rotation of the spool 19.

I have described above the preferred form of my invention without however limiting it in respect to materials, proportions or structural details other than by the scope of the following claims:

What I claim is:

1. A fishing reel having a pair of cheek plates having outer recesses, a seat bar attached to said cheek plates, bearings in said cheek plates, a spool having a sleeve journaled in said bearings and extending outwardly into said recesses, an inner clutch plate on each end of the sleeve, a sectional tubular shaft centrally of the sleeve, means for interlocking the shaft sections, outer clutch plates on the outer ends of the shaft, a hub on one end of the shaft outside of the clutch plate, a crank on the hub, a spindle extending through the hub and shaft and adjustably screw-threaded into the remote shaft section, manually operable means outside the crank for adjusting the spindle, a spring held pawl for each outer clutch plate and a click for each inner clutch plate.

2. A fishing reel having a pair of cheek plates having outer recesses, a seat bar attached to said cheek plates, bearings in said cheek plates, a spool having a sleeve journaled in said bearings and extending outwardly into said recesses, an inner clutch plate on each end of the sleeve, a sectional tubular shaft centrally of the sleeve, said shaft sections having interlocking notched ends, outer clutch plates on the outer ends of the shaft, a hub on one end of the shaft outside of the clutch plate, a crank on the hub, a spindle extending through the hub and shaft and adjustably screw-threaded into the remote shaft section, manually operable means outside the crank for adjusting the spindle, a spring held pawl for each outer clutch plate and a click for each inner clutch plate.

3. A fishing reel having a pair of cheek plates having outer recesses, a seat bar attached to said cheek plates, bearings in said cheek plates, a spool having a sleeve journaled in said bearings and extending outwardly into said recesses, an inner clutch plate on each end of the sleeve, a sectional tubular shaft centrally of the sleeve, means for interlocking the shaft sections, outer clutch plates on the outer ends of the shaft, a hub on one end of the shaft outside of the clutch plate, a crank on the hub, a spindle extending through the hub and shaft and adjustably screw-threaded into the remote shaft section, a detent in the hub for the spindle, manually operable means outside the crank for adjusting the spindle, a spring held pawl for each outer clutch plate and a click for each inner clutch plate.

4. A fishing reel having a pair of cheek plates having outer recesses, a seat bar attached to said cheek plates, bearings in said cheek plates, a spool having a sleeve journaled in said bearings and extending outwardly into said recesses, an inner clutch plate on each end of the sleeve, bushings within said sleeve, a sectional tubular shaft loosely journaled in said bushings, means for interlocking the shaft sections, outer clutch plates on the outer ends of the shaft, a hub on one end of the shaft outside of the clutch plate, a crank on the hub, a spindle extending through the hub and shaft and adjustably screw-threaded into the remote shaft section, manually operable means outside the crank for adjusting the spindle, a spring held pawl for each outer clutch plate and a click for each inner clutch plate.

5. A fishing reel having a pair of cheek plates having outer recesses and radial extensions, a seat bar attached to said extensions, central bearings in said cheek plates, a spool having a sleeve journaled in said bearings and extending outwardly into said recesses, a clutch plate on each end of the sleeve, a sectional tubular shaft centrally of the sleeve, means for interlocking the shaft sections, clutch plates on the outer ends of the shaft, a hub on one end of the shaft outside of the clutch plate, a crank on the hub, a spindle extending through the hub and shaft and adjustably screw-threaded into the remote shaft section, manually operable means outside the crank for adjusting the spindle, a spring held pawl for each outer clutch plate, a click for each inner clutch plate, and manually operable means for engaging said clicks.

FRANK CRAWFORD.

REFERENCES CITED

The following references are of record in the file of this patent:

UNITED STATES PATENTS

| Number | Name | Date |
|---|---|---|
| 1,941,739 | Crawford | June 2, 1934 |
| 2,180,321 | Kovalovsky et al. | Nov. 14, 1939 |